Figure 1:
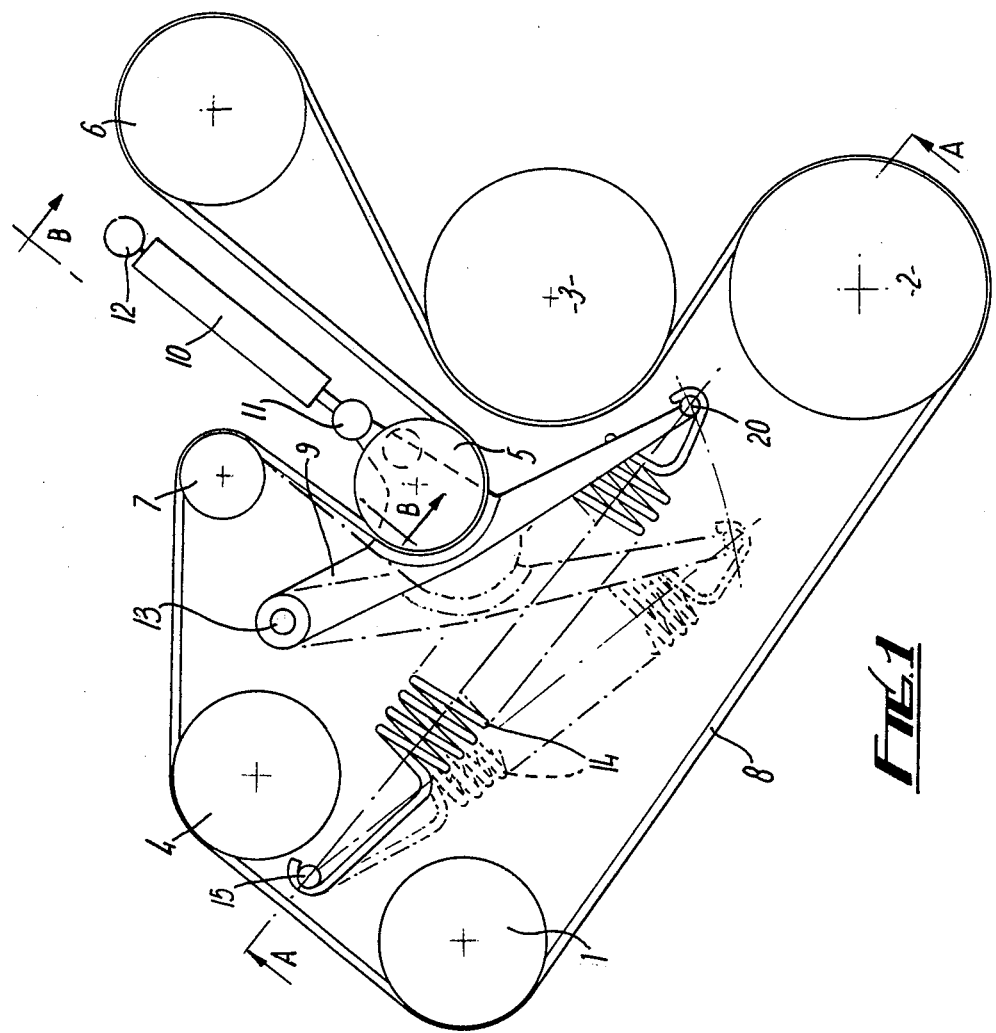

United States Patent [19]

Edwards

[11] Patent Number: 4,917,654
[45] Date of Patent: Apr. 17, 1990

[54] BELT TENSIONING ARRANGEMENT
[75] Inventor: Derek J. Edwards, Crewe, England
[73] Assignee: Rolls-Royce Motor Cars Limited, Crewe, England
[21] Appl. No.: 191,217
[22] Filed: May 6, 1988
[30] Foreign Application Priority Data
May 15, 1987 [GB] United Kingdom ............... 8711522
[51] Int. Cl.⁴ .............................................. F16H 7/08
[52] U.S. Cl. ..................................... 474/133; 474/135
[58] Field of Search ............... 474/101, 109, 111, 113, 474/115, 117, 118, 133, 134, 135

[56] References Cited

U.S. PATENT DOCUMENTS

| | | | |
|---|---|---|---|
| 1,319,066 | 10/1919 | Grob | 474/117 |
| 1,402,891 | 1/1922 | Reiland et al. | 474/117 |
| 1,605,962 | 11/1926 | Lovejoy | 474/135 |
| 2,022,052 | 11/1935 | Morton | 474/115 X |
| 2,499,287 | 2/1950 | Wilson | 474/135 |
| 2,663,195 | 12/1953 | Horan | 474/135 |
| 3,800,612 | 4/1974 | Fulghum | 474/135 |
| 4,033,196 | 7/1977 | Maeda | 474/135 |
| 4,381,165 | 4/1983 | James et al. | 474/135 X |
| 4,509,935 | 4/1985 | Foster | 474/138 |
| 4,518,373 | 5/1985 | Roth | 474/109 |
| 4,521,208 | 6/1985 | Doveri | 474/101 |
| 4,530,682 | 7/1985 | Gruber et al. | 474/133 |
| 4,761,155 | 8/1988 | Kinoshita et al. | 474/118 X |

FOREIGN PATENT DOCUMENTS 234732 9/1987 European Pat. Off. .......... 474/111
2608277 9/1977 Fed. Rep. of Germany .

Primary Examiner—Jerome W. Massie
Assistant Examiner—Matthew Smith
Attorney, Agent, or Firm—Cushman, Darby & Cushman

[57] ABSTRACT

A belt tensioning arrangement for an endless belt disposed around a series of pulleys comprises a movable pulley rotatably mounted on a T-shaped lever. A spring is connected between a fixed point and one end of the cross of the T. The other end of the cross is connected to a fixed point and the upright of the T to one end of a damper the other end of which is connected to a fixed point. The arrangement is such as to provide for constant belt tension for considerable variations in belt length without mechanical adjustment.

4 Claims, 4 Drawing Sheets

BELT TENSIONING ARRANGEMENT

The present invention relates to a belt tensioning arrangement for an endless belt. The belt is intended, particularly, but not exclusively, for an internal combustion engine. Tensioning arrangements are known with a swinging pulley which may be locked mechanically in position. Belt tension adjustment is a laborious process, and requires frequent readjustment of the swinging pulley to compensate for belt stretch in service. The actual tension induced in the belt is difficult to evaluate.

In other belt tensioning systems known to the applicants, spring load pulleys are provided to accommodate changes in belt length. With these, however, the geometry of their mechanism is such that large variations of load must occur for any changes in belt length. Also the variation of belt length that they can accommodate are insufficient for the manufacturing limits and stretch in service of the very long serpentine style poly rib vee belts now coming into use for driving the auxiliaries on automobile engines.

Calculated variation of belt tension for such known existing systems is 66% and change of belt length that can be accommodated is 11 mm.

According to the present invention there is provided a belt tensioning arrangement for an endless belt adapted for disposition around a plurality of pulleys in which one of the pulleys is mounted for movement with respect to the remaining pulley or pulleys whereby to accommodate changes in length of the belt and means are provided for moving the said one pulley in response to changes in belt length whereby to maintain the tension in the belt substantially constant.

In a preferred embodiment of the invention, the means for moving comprises resilient means. One end of these means is connected to a lever which is mounted for pivotal movement about a fixed point. The lever is also connected to a damper and the movable pulley is connected to the lever. The resilient means, preferably a spring, is disposed within the envelope of the belt as is also the lever. For the most advantageous geometrical arrangement, the point of connection for the other end of the spring should be as far as possible beyond a line, at 90° to a spring centre line and passing through the pivot point of the lever and the centre of the movable pulley should be nearer to the spring than a line at 90° to the line of belt pull on the pulley passing through the pivot point of the lever. Also the distance between the point of connection of the other end of the spring and the point of connection of spring to lever must be great to allow space for a spring of low rate such as to create from it a force on the movable pulley which is close to constant throughout the range of pulley positions.

Figure 2:
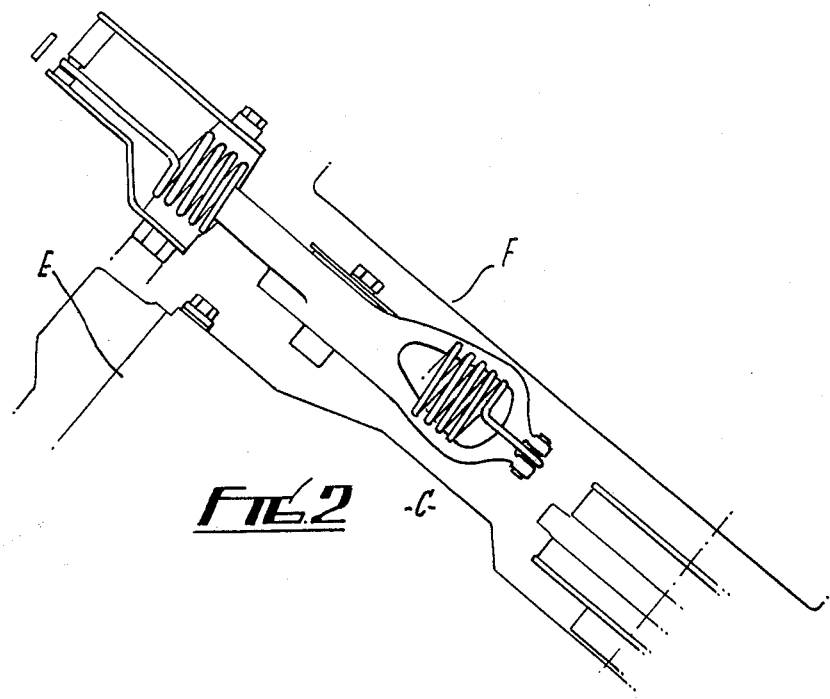
Figure 3:
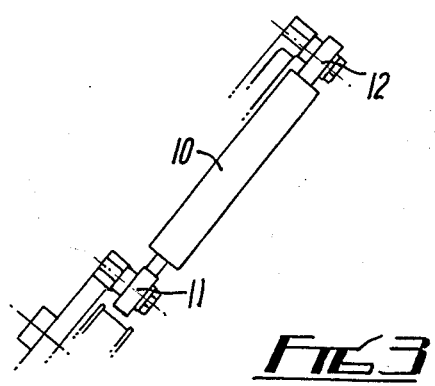
Figure 4:
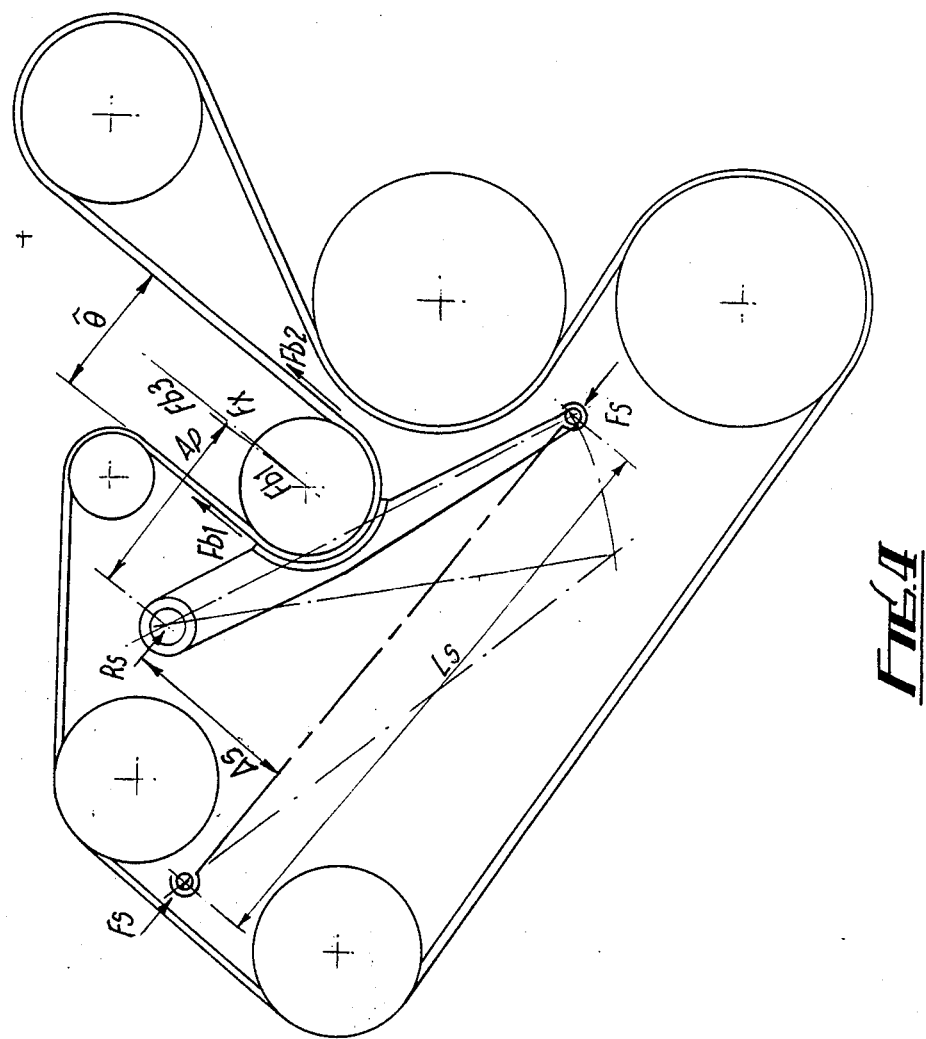
Figure 5:
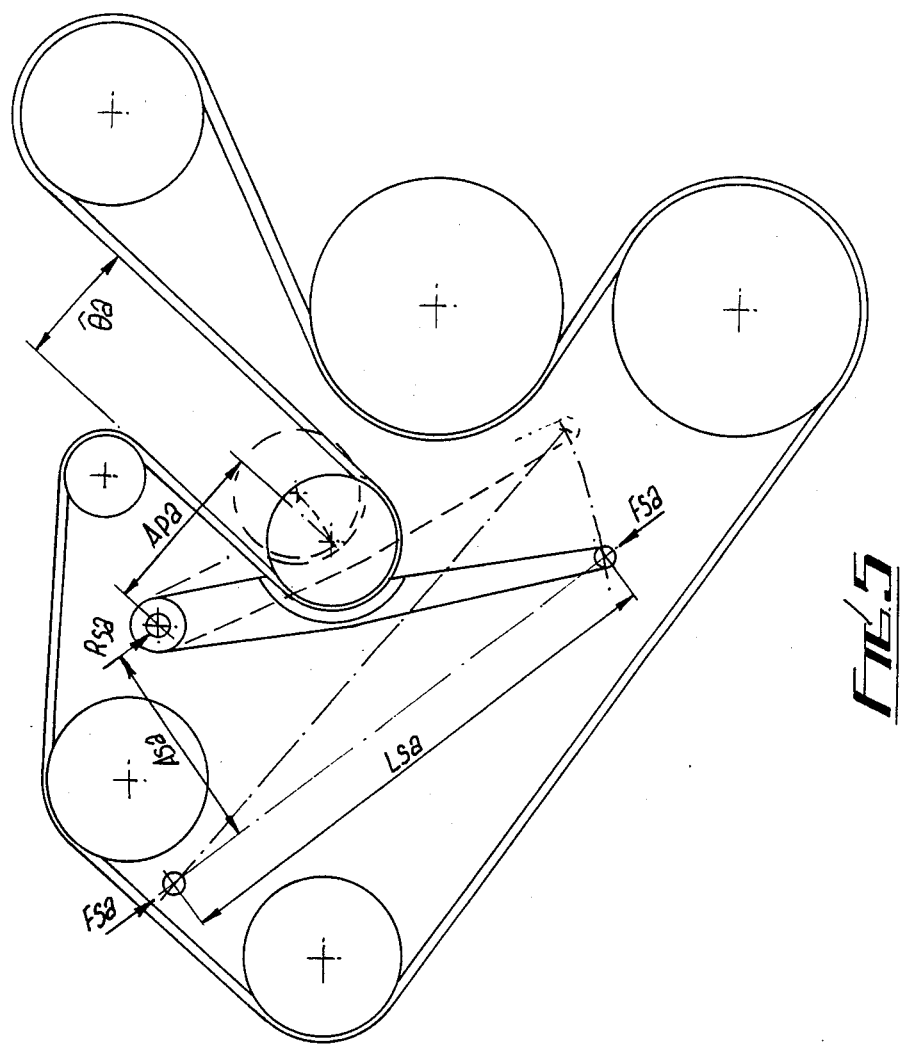

In order that the invention may be more clearly understood, one embodiment thereof will now be described, by way of example, with reference to the accompanying drawings, in which:

FIG. 1 is a front elevational view of one embodiment of a belt tensioning arrangement for a vehicle, FIG. 2 is a detail view of the T-lever and spring of FIG. 1, FIG. 3 is a detail view of the damper and T-lever of FIG. 1, FIG. 4 is a force diagram for the arrangement of FIG. 1 with the belt in a short condition, and FIG. 5 is a force diagram for the arrangement of FIG. 4 with the belt in an elongated condition.

Referring to FIGS. 1 to 3 the arrangement comprises seven pulleys 1 to 7 around which an endless belt 8 of V-shaped cross-section is disposed. Pulley 2 is connected to the engine crankshaft and pulleys 1,3,4,6 and 7 are provided for various engine driven auxiliary devices. The arrangement is disposed between the front face of the vehicle engine E (specifically the chain case C) and the fan blade F (see FIG. 2). Pulley 5 is a belt tensioner idler pulley. This is rotatably mounted on a T-shaped lever 9 which is in turn connected at 11 to a telescopic damper 10. The damper 10 is pivotally mounted on the front face of the engine E of the vehicle by a pivot 12. The T-shaped lever 9 is also pivotally mounted on the front face of the vehicle engine by a pivot 13. The end 20 of the cross of the 'T' of the lever remote from the pivot 13 is connected to one end of a spring 14, the other end of which is connected to a fixed pivot point 15 attached to the front face of the engine. The lever 9, pulley 5 and spring 14 are shown in full line in the short belt position and in dash dotted line in the long belt position.

The arrangement operates as follows. For a given movement of the belt tensioning pulley 5 the greatest change of belt length is achieved if the strand of belt approaching the pulley 5 is parallel to the strand of belt leaving the pulley, that is on FIG. 4 $\theta=0$ and on FIG. 3 $\theta_a=0_1$. Also if $\theta$ is approximately equal to 0 for all pulley positions then a constant force on the pulley gives a constant tension in the strands of the belt.

FIG. 4 shows the geometry with the shortest belt and FIG. 5 the geometry with the longest belt. Between these two belt lengths, the spring length is reduced from Ls to Lss. Thus the spring force decreases by an amount dependent upon the spring rate, but the translation of this spring force into a turning movement on the lever arm is influenced by the increasing vertical distance of the line of action of the spring force from the pivot 13 that is, Asa>As on FIGS. 4 and 5. The relationship between spring load (Fs) and belt tension (Fb) for the shortest belt is $$(\text{see FIG. 4}) \quad Fb = \frac{Fs \times As}{Ap} \left( \frac{1}{2\cos\left(\frac{\theta}{2}\right)} \right)$$

and for longest belt is $$(\text{see FIG. 5}) \quad Fba = \frac{Fsa \times Asa}{Apa} \left( \frac{1}{2\cos\left(\frac{\theta a}{2}\right)} \right)$$

and if the belt strands on each side of the tensioning pulley are parallel then $\theta=\theta a=0°$ and $$\cos\left(\frac{\theta}{2}\right) = \cos\left(\frac{\theta a}{2}\right) = 1$$

The relationship between spring load Fs and belt tension Fb becomes for the shortest belt $$Fb = \frac{Fs \times As}{2Ap}$$

and for the longest belt $$Fba = \frac{Fsa \times Asa}{2Apa}$$

Remembering these equations and referring to FIG. 1, the spring pivot 15 should be as far as possible beyond a line at 90° to a spring centre line and which passes through pivot 13 to give the arrangement an increasing moment arm; and the centre of the pulley 5 must be nearer to the spring 14 than a line at 90° to a line of belt pull on the pulley and which passes through pivot 13; and the distance between pivot 15 and point 20 must be great enough to allow space for a spring of low rate such that it will create a force on the pulley 5 that is close to constant throughout the range of pulley 5 position.

The above described embodiment enables constant belt tension to be achieved for considerable variations in belt length, without mechanical adjustment. Also, by putting the spring and damper in the same plane as the belt, overall engine length and pulley overhang on the auxiliary mechanism is reduced. This, combined with better controlled belt pulls, reduces bearing loads in the auxiliaries and reduces the power absorbed in driving them. Belt tension changes can be kept within 3% for changes in belt length of 71 mm.

The device of the invention also compensates for any thermal expansion of the engine that takes place when the temperature of the engine increases. Such expansion obviously increases the centre distances between all the pulleys and would add to the tension in the belt if the device was not present. This compensation increases the life of the belt by, again, maintaining the belt tension value in accordance with the value determined as correct when the engine is built.

It will be appreciated that the above embodiments have been described by way of example only and that many variations are possible without departing from the invention.

I claim:

1. A belt tensioning arrangement for an endless belt adapted for disposition around a plurality of pulleys to define an envelope in which one of the pulleys is mounted for movement with respect to the remaining pulleys to accommodate changes in length of the belt comprising means for moving the said one pulley in response to changes in belt length whereby to maintain the tension in the belt substantially constant, resilient means forming part of the means for moving and having an axis and an end remote from a lever which is mounted for pivotal movement about a fixed point and which is connected to the said one pulley and a damper connected to the lever, the resilient means and the lever being disposed within the envelope of the belt, and the end of the resilient means one from the lever being spaced away from a line drawn substantially at right angles to the axis of the resilient means and passing through the pivot of the lever.

2. A belt tensioning arrangement as claimed in claim 1, in which the centre of the movable pulley is nearer to the resilient means than a line extending substantially at right angles to the direction of belt pull on the pulley passing through the pivot point of the lever.

3. A belt tensioning arrangement as claimed in claim 1, in which the distance between the point of connection of the resilient means to the lever and the other end of the resilient means is great enough to permit the disposition of resilient means at such a rate as to provide a force on the movable pulley which is substantially constant through the range of pulley positions.

4. A belt tensioning arrangement as claimed in claim 1 in which the means for moving comprise a spring.

* * * * *

UNITED STATES PATENT AND TRADEMARK OFFICE
CERTIFICATE OF CORRECTION

PATENT NO. : 4,917,654

DATED : April 17, 1990

INVENTOR(S) : Derek James EDWARDS

It is certified that error appears in the above-identified patent and that said Letters Patent is hereby corrected as shown below:

Column 4, line 22, change "one" to --remote--.

Signed and Sealed this

Thirty-first Day of March, 1992

Attest:

HARRY F. MANBECK, JR.

*Attesting Officer*   *Commissioner of Patents and Trademarks*